W. N. HAMILTON.
Grain Drill.
No. 83,491. Patented Oct. 27, 1868.
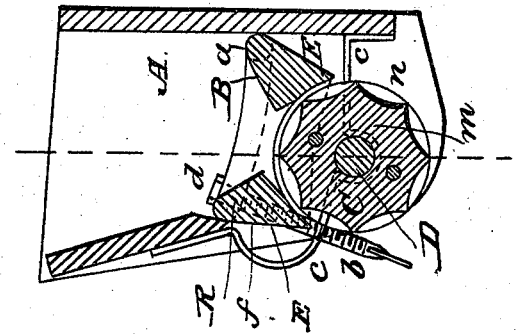
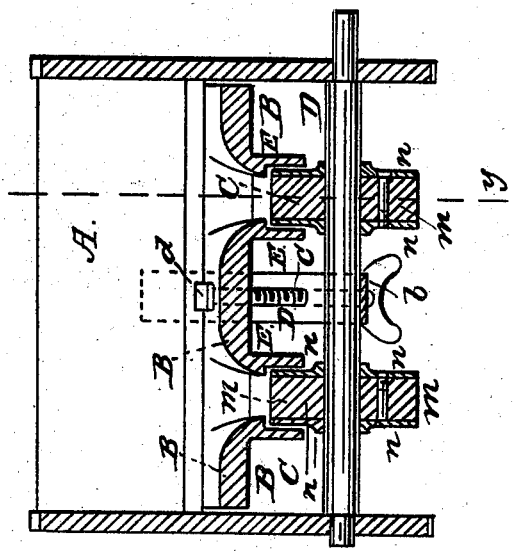
Witnesses
M. Bailey
Inventor
W. N. Hamilton
by J. A. Pollok
his atty

W. N. HAMILTON, OF ODESSA, DELAWARE.

Letters Patent No. 83,491, dated October 27, 1868.

IMPROVEMENT IN GRAIN-DRILLS.

The Schedule referred to in these Letters Patent and making part of the same.

*To whom it may concern:*

Be it known that I, W. N. HAMILTON, of Odessa, county of New Castle, and State of Delaware, have invented certain new and useful Improvements in Attachments to Drills for Sowing Grain, Phosphates, and other Fertilizers; and I hereby declare the following to be a full, clear, and exact description of the same, reference being had to the accompanying drawings, in which—

Figure 1 is a longitudinal vertical section of that portion of a fertilizer-attachment to which my improvements are applied.

Figure 2 is a transverse vertical section of the same on the line $x-y$, fig. 1.

My invention relates to the machine, for sowing phosphates and other fertilizers, for which Letters Patent of the United States were issued to C. C. Foster, on the 28th April, 1868.

While the machine referred to undoubtedly possesses great merit, especially as an attachment to grain-drills, it nevertheless is open to objections in some respects, for there are no means provided for regulating the dose or quantity of the fertilizing-compound dropped in the ground at any one point, and the distributing-wheel, the revolution of which causes the discharge of the fertilizing-compound, is apt to become clogged and filled up, thus preventing the operation of the machine. This latter defect is owing to the nature of the material—iron—of which the wheel is made, for not only does the ammonia of the fertilizer attack the iron, but the compound, at all times, and especially when moist, adheres to the wheel with great ease, and soon clogs it, and causes it to rust.

The object of my invention is to remedy these defects; and, to this end, it consists—

First, in the employment, in a machine of the kind referred to, of an adjustable bottom for the fertilizer-hopper or receptacle, capable of being moved from or towards the distributing-wheels, so as to increase or diminish, at pleasure, the quantity of the phosphate or other fertilizer which passes out from the hopper to the ground.

Second, in combining, with the fertilizer-receptacle, and distributing-wheel or wheels, and shaft, arranged under the receptacle, as hereinafter described, an adjustable bottom, hinged to the front of said receptacle, and actuated by a set-screw, mounted in bearings attached to the frame of the machine, so as to increase or lessen its distance from the distributing-wheels, for the purposes above stated.

Third, in constructing the distributing-wheel of glass or porcelain, or of metal, or other suitable material, enamelled or coated with porcelain or other silicate, which the ammonia of the fertilizer will not attack, and to which the compound will not adhere to any appreciable extent.

To enable others skilled in the art to make and use my invention, I will now proceed to describe the manner in which the same is or may be carried into effect, by reference to the accompanying drawings.

I have not deemed it necessary to represent any more of the machine than that portion of it to which my invention particularly relates.

The front of the hopper or fertilizer-receptacle A is intended to be attached to the rear of the hopper of a grain-drill, in such position that the phosphate, passing through the apertures in the bottom, B, of the hopper, and from the distributing-wheels C, will fall in the furrows in which the grain is dropped by the drill in front.

Under the hopper A is mounted a shaft, D, supported in bearings in the frame of the machine, and caused to revolve by means of gearing connected with the driving-gear of the drill, as described in the Letters Patent hereinbefore referred to. The distributing-wheels C are keyed upon this shaft, in number corresponding to the number of bevelled openings or apertures in the bottom of the hopper, and arranged so that, at top, they will fit within saddles, E, formed on the under side of the bottom, and around the openings in the same.

The surface or periphery of the wheels is recessed or cut away, as shown in the drawings, so that such recesses, in conjunction with the saddles, will form what may be called "cut-offs," for regulating the discharge of the fertilizer. The compound, passing down, through the bevelled openings in the bottom, into the successive recesses in the wheels, will be carried along by the revolution of the latter, and will be discharged, through chutes or other suitable ducts placed beneath the wheels, into the furrows in which the grain has been dropped.

As before stated, in the machine as heretofore constructed, there has been no way of regulating the discharge of the fertilizing-compound, nor of increasing or lessening the size of the discharge-openings, according to the nature of the fertilizer employed. To remedy this defect, I provide the hopper A with an adjustable bottom, B, which, together with the saddles E, can be raised from or lowered towards the distributing-wheels, so as to increase or lessen the distance between them, and consequently to correspondingly increase or lessen the size of the openings between the saddles and wheels, from which the fertilizing-compound is discharged.

The bottom may be made adjustable in various ways. I prefer, however, to employ the means shown in the drawings, although it will, of course, be understood that I do not limit my claim to the employment of the special devices therein represented. The bottom is hinged to the front of the machine-hopper by means of cylindrical pins, $a$, one at each end, which fit in sockets formed in the sides and towards the front of the hopper; or, if desired, the bottom may be attached, by means of ordinary hinges, to the front of the hopper.

The rear portion of the bottom is held in position by means of a set or adjusting-screw, $b$, which is held in a screw-threaded bearing-piece, c, attached to the frame, as shown in the drawing, and extending out to the rear, so as to form a support for the adjusting-screw b, which extends at about right angles to the bottom.

The end of the screw passes loosely through the bottom, the two being held together by means of a nut, d, on the screw, which rests against the upper side of the bottom, and a washer, f, on the screw, which bears against the under side of the bottom.

By turning the screw to the right or left, it will be moved upwards or downwards in its bearing, c, causing a corresponding movement of the bottom, B, by reason of the washer f and nut d, by which the bottom and screw are held together. Thus the bottom and the saddles E can be adjusted at any required distance from the distributing-wheels, and, consequently, the quantity of the fertilizing-compound discharged can, with the utmost facility, be increased or lessened to the desired extent.

I may say here that I much prefer, for many reasons, both for the sake of convenience and economy, to make the bottom and saddles of metal, cast in one piece. I am thereby saved the trouble and expense of making the parts separately, and afterwards fitting and uniting them together, and I produce a much more durable and lasting machine than can otherwise be made.

With reference to my improvement in the direction of the construction of the distributing-wheels, I make that portion of them which is brought in contact with the phosphate or other fertilizing-compound, of porcelain, glass, or other silicate, for the purposes above referred to.

In the drawings, I have represented a solid wheel of glass, m, cast or pressed into the required shape, and held between two disks, n, by means of pins, screws, or other suitable appliances.

The wheel, when made, is keyed on the shaft D in the usual manner.

Instead of making the wheel of glass, the material employed may be porcelain, or iron or other metal coated with a silicate.

This portion of my invention will be understood without further explanation, and its practical value will readily be appreciated by those who have occasion to employ machinery of this kind.

There is no liability to rust, the phosphate will not adhere to and clog up the wheel, and the ammonia and other salts found in fertilizing-compounds, which are so destructive to iron or metal wheels, will not attack the silicate.

In order to remove all possibility of the adhesion of the phosphate, no matter how moist or sticky it may be, I contemplate attaching to the rear of the hopper a steel or brass-plate spring, curved so as to extend below the wheel, in connection with which it is used, and carrying, on its end, a brush, of suitable material, which will press against the revolving wheel, so as to rub the compound out of each depression or recess in its periphery.

Having now described my invention, and the manner in which the same is or may be carried into effect,

What I claim, and desire to secure by Letters Patent, is—

1. The employment, in the fertilizer-hopper or receptacle, of an adjustable bottom, capable of being moved from or towards the distributing-wheels, so as to increase or diminish, at pleasure, the size of the openings from which the fertilizing-compound in the hopper is discharged, substantially as and for the purposes set forth.

2. The combination, with the fertilizer-receptacle and distributing-wheel or wheels, arranged beneath and relatively to the receptacle, as described, of an adjustable bottom, hinged to the front of said receptacle, and actuated by a set-screw, united with said bottom, and mounted in bearings attached to the frame of the machine, under the arrangement and for operation substantially as set forth.

3. Forming the adjustable bottom of the hopper, and the saddles attached to the same, of metal, cast in one piece, as and for the purposes specified.

4. The employment, in machines such as described, of distributing-wheels formed of glass, porcelain, or other silicate, or of metal enamelled or coated with a silicate, substantially in the manner and for the purposes shown and set forth.

In testimony whereof, I have signed my name to this specification before two subscribing witnesses.

W. N. HAMILTON.

Witnesses:
A. POLLOK,
M. BAILEY.